US006802452B2

(12) United States Patent
Lebaschi et al.

(10) Patent No.: US 6,802,452 B2
(45) Date of Patent: Oct. 12, 2004

(54) BAR CODE SCANNER AND METHOD

(76) Inventors: Ali Lebaschi, 7852 Camino Raposa, San Diego, CA (US) 92122; Scott Bradley, 13275 Capstone Dr., San Diego, CA (US) 92130; Hak Kim, 10046 Paseo Montril, #409, San Diego, CA (US) 92129

( * ) Notice: Subject to any disclaimer, the term of this patent is extended or adjusted under 35 U.S.C. 154(b) by 181 days.

(21) Appl. No.: 10/193,976

(22) Filed: Jul. 12, 2002

(65) Prior Publication Data

US 2004/0046025 A1 Mar. 11, 2004

(51) Int. Cl.[7] .............................................. G06K 13/00
(52) U.S. Cl. .................. 235/476; 235/477; 235/462.12; 235/436; 235/380
(58) Field of Search ................................ 235/379, 380, 235/383, 483, 462.01, 462.12, 462.24, 475, 476, 477

(56) References Cited

U.S. PATENT DOCUMENTS

| | | | |
|---|---|---|---|
| 4,798,942 A | * 1/1989 | Aubrey ........................ 235/384 |
| 4,903,815 A | 2/1990 | Hirschfeld et al. |
| 5,241,164 A | * 8/1993 | Pavlidis et al. ......... 235/462.12 |
| 5,243,655 A | 9/1993 | Wang |
| 5,331,176 A | 7/1994 | Sant'Anselmo et al. |
| 5,345,090 A | * 9/1994 | Hludzinski ................... 250/566 |
| 5,457,308 A | * 10/1995 | Spitz et al. ............. 235/462.12 |
| 5,569,902 A | 10/1996 | Wood et al. |
| 5,723,868 A | 3/1998 | Hammond, Jr. et al. |
| 5,756,981 A | 5/1998 | Roustaei et al. |
| 5,818,023 A | 10/1998 | Meyerson et al. |
| 5,866,888 A | 2/1999 | Bravman et al. |
| 5,886,334 A | 3/1999 | D'Entremont et al. |
| 5,898,162 A | 4/1999 | Koenck et al. |
| 5,912,452 A | 6/1999 | Wiklof et al. |
| 5,914,476 A | * 6/1999 | Gerst et al. ............. 235/462.07 |
| 6,045,047 A | 4/2000 | Pidhirny et al. |
| 6,129,280 A | * 10/2000 | De Renzis et al. ...... 235/462.22 |
| 6,193,156 B1 | 2/2001 | Han et al. |
| 2003/0146276 A1 | * 8/2003 | Bennett et al. .............. 235/378 |

FOREIGN PATENT DOCUMENTS

JP           10057601 A   *  3/1998   ............. A63F/7/02

* cited by examiner

Primary Examiner—Diane I. Lee
(74) Attorney, Agent, or Firm—Donn K. Harms

(57) ABSTRACT

An improved card scanner for imaging and decoding indica such as bar codes on a side surface of an inserted card. The device is electrically powered and features a double scanning method using an electronic imaging element and processor which turns off unnecessary power when not required. This is accomplished through the use of a processor and software to determine if a complete image of the bar code on the inserted card has been captured and allowing immediate removal of the card. Should the image of the bar code be incomplete, a second scan is conducted of the bar code as it is removed and a complete image formed from the two individual scans. The device can also be used to compare photographs scanned from a card with the digital photograph scanned from a two dimensional bar code and to display both photos for viewing.

25 Claims, 4 Drawing Sheets

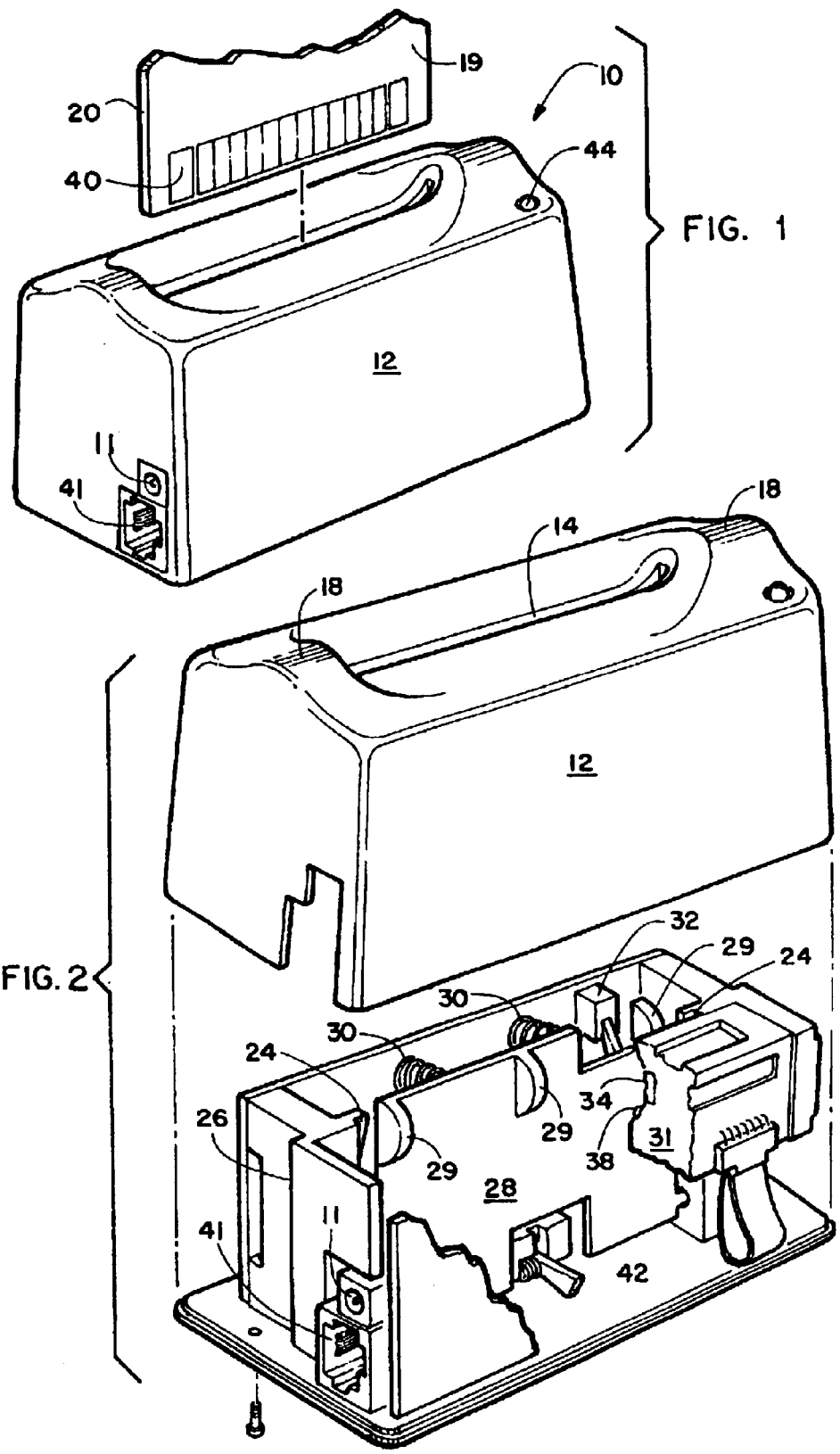

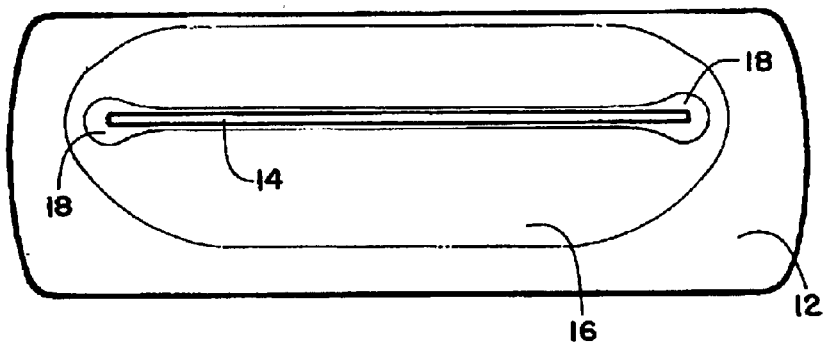
FIG. 3
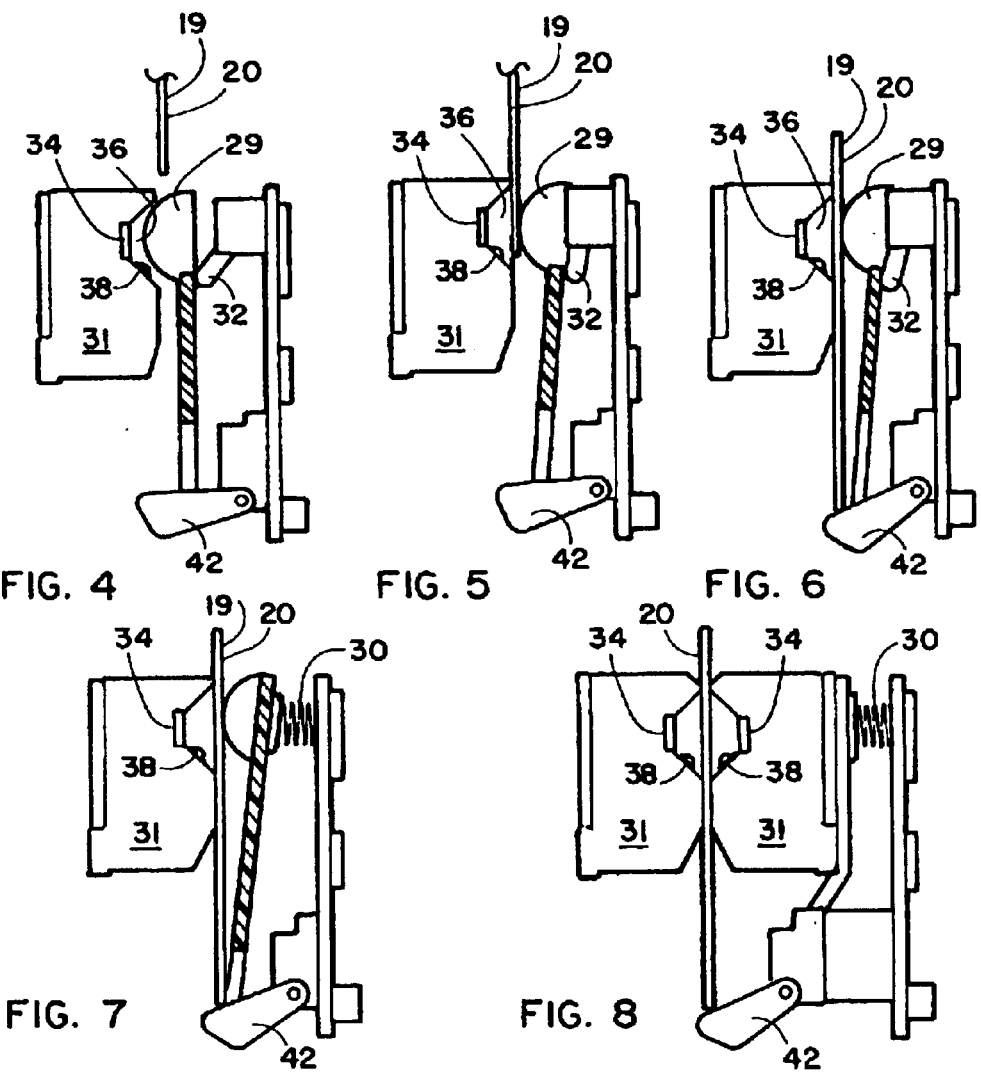
FIG. 4  FIG. 5  FIG. 6
FIG. 7  FIG. 8

BAR CODE SCANNER AND METHOD

FIELD OF TEE INVENTION

The disclosed device relates to bar code scanners which are used to scan card resident bar codes for identification and other purposes in most industrialized countries. More particularly it relates to an improved method and apparatus for the faster and more accurate reading of linear and 2D bar codes which allows for progressive reading of the card when inserted into the reader thereby eliminating any aiming by the user as well as providing fast and accurate reading of the card which is read as it is pushed into the reader. The device uses a line by line approach to reading of the card as it moves laterally across the sensor. It also self aligns the card with the reading device, eliminates the need for the user to aim a reading device at the card, while concurrently alleviating the time delays caused by conventional image type readers as well as lowering power consumption and the size requirements of the card reader itself. The device also incorporates a unique method of reading such bar codes which provides for a second scan of the barcode during exit from the device wherein it will either scan the entire barcode, or scan the barcode and combine it with the first scan to find missing data from the first scan, only if needed, thereby speeding up the scanning of the bar code.

BACKGROUND OF THE INVENTION

Ever prevalent in the lives of people in most industrialized countries is the use of bar codes to identify products and memorialize other information. There are typically two types of bar codes in commercial use, a linear (1D) barcode and a two dimensional (2D) barcode. A conventional 1D bar code (one dimensional UPC bar code) is just a different way of encoding numbers and letters by using a combination of bars and spaces of varying widths which in essence is just another manner of entering data into a computer. A bar code generally does not contain descriptive data. It is a reference number that a computer uses to look up an associated record that contains descriptive data and other important information. For example, a barcode found on a soda can does not contain the product name, type of soda, or price, instead, it contains a 12-digit product number. When this number is scanned by the cashier at the check-out, it is transmitted to the computer which finds the record associated with that item number in the data base. The matching item record contains a description of the product, vendor name, price, quantity-on-hand, etc. The computer instantly does a "price lookup" and displays the price on the cash register. It also subtracts the quantity purchased from the quantity-on-hand. This entire transaction is done instantly. In a nutshell, a bar code typically has ID data encoded in it, and that data is used by computer to look up all specific information associated with the data.

Since computers cannot "read" bar codes, for a computer to make use of the information contained in the bar code, the bar code data must be captured and decoded into a data format that the computer can process. The device which reads or captures the bar code information and sends it to the decoder, is known as the bar code reader, generally called bar code scanner. A typical bar code reader kit consists of a scanner, decoder, and cable which interfaces the decoder to the computer. The Scanner scans the Bar Code symbol and captures the bars and spaces of the bar code and sends it to the decoder. The decoder translates the bars and spaces into corresponding electrical output and transmits that data to the computer in a traditional data format. A bar code scanner can either have the Decoder built into it, or have an interface between it and the computer.

The 2D barcode unlike linear codes can store the data within the code, therefore eliminating the needs for access to a database for getting the information. Large amounts of text and data can be stored securely and inexpensively. Some 2D bar codes are like a set of linear bar codes literally stacked on top of each other. Conventionally, the PDF417 is the best example of a stacked-bar symbol and is the most common of all 2D bar codes currently in use today. 2D bar codes also uses an advanced error correction instead of a check digits system. This error correction allows the symbol to withstand some physical damage without causing loss of data. This high level of error correction is far more advanced than conventional 1D linear bar codes with check digits.

Currently, four of the different types of bar code readers available include the pen type readers (bar code-wands), laser bar code scanners, CCD (Charge Couple Devices) barcode readers and camera-based barcode readers used for most two dimensional (2D) bar codes which contain much more information than standard vertical line bar codes. Each of these types uses a slightly different technology for reading and decoding a bar code.

Pen type barcode readers have a light source and a photo diode placed next to each other in the tip of a pen or wand. To read a bar code, a user drags the tip of the pen across all the bars, in a steady even motion. The photo diode measures the intensity of the light reflected back from the light source and generates a waveform corresponding to the widths of the bars and spaces in the bar code. The barcode reader sends the waveform to the decoder, which decodes the waveform and sends it to the computer in a traditional data format.

Laser barcode scanners work the same way as pen type barcode readers. The only main difference is that Laser barcode scanners use a laser beam as their light source, and typically employ either a reciprocating mirror or a rotating prism to scan the laser beam back and forth across the bar code. As with the pen type bar code reader, a photo diode is used to measure the intensity of the light reflected back from the bar code.

CCD barcode scanners use an array of tiny light sensors lined up in a row in the head of the barcode reader. Voltage waveform corresponding to the bars and spaces of the bar code is generated and sent to the decoder, which decodes the data and sends it to the computer. The main difference between a CCD barcode scanner, a pen type barcode scanner, and laser barcode scanner is that the CCD barcode scanner measures emitted ambient light from the bar code whereas pen or laser barcode scanners measure reflected light of a specific frequency originating from the scanner itself.

The camera-based barcode readers used for the majority of 2D bar codes which are becoming more popular due to increased data carrying ability, use a small video camera to capture an image of a bar code. The barcode reader then transmits that information to a computer and uses sophisticated digital image processing techniques to decode the bar code. Unfortunately this type of image processing of the entire 2D bar code is time consuming, requires the aiming of a camera to properly capture the image, consumes large amounts of computer processing and memory as well as requiring substantial electrical power to run the camera.

Linear bar codes are decoded along one axis or direction and generally encode data characters as parallel arrangements of alternating, multiple-width strips of lower reflectivity or "bars" separated by absences of such strips having higher reflectivity or "spaces." Each unique pattern of bars and spaces within a predetermined width defines a particular data character. A given linear symbol encodes several data characters along its length as several groups of unique bar and space patterns.

Newer data collection symbologies have departed from the typical linear symbologies to create 2D stacked or area symbologies in order to increase the amount of information encoded within a given area. Stacked symbologies or "multi-row symbologies" employ several adjacent rows of multiple-width bars and spaces. "Area symbologies" or 2D matrix symbologies employ arrangements of regular polygonal data cells where the center-to-center distance of adjacent cells is uniform Reading stacked symbologies and 2D area technologies with scanning beam-type detectors typically involves a scanning approach where the beam is scanned by hand by a user with the scanner, horizontally across the large object a number of times to capture the image line by line. The user must be very careful as to the distance the card is held from the scanner or it won't work correctly. Also, ambient light and reflections from the card surface itself can interfere with the imaging. For each sweep, the sensor output is converted to a digital signal. The digital signal is then mapped into a two-dimensional character array and processed by the computer as a whole to decode the symbol or symbols. Such line by line scanning is very time consuming, and frequently hard to accomplish as the user may shift the reader. Thus the reader will then have an incorrect indication of the relative locations of light and dark regions, thereby impairing decoding. If the card on which the bar code is resident is bent, the problems of the resulting image are increased.

To overcome such problems, two-dimensional readers have been employed that use cameras, or semiconductor or other suitable light receiving elements that image the entire two-dimensional area substantially simultaneously. This is a memory intensive operation for the processor and due to optical limitations inherent in such imaging devices. Further, these readers have a relatively small depth of field within which symbols can be read. To increase the reader's depth of field, some two-dimensional readers employ auto focus systems which are costly and relatively slow. Moreover, even readers with auto focus systems are limited by the depth-of-field of the auto focus system. Also, bent cards with resulting bent code strips can exacerbate the reading problems. Still further, even when reading linear or stacked symbologies, such systems employ relatively complex area-type processing for finding, identifying and decoding. The complexity of such processing makes these readers undesirably slow, and large as a system, for many linear and stacked technology applications.

U.S. Pat. No. 6,193,156 (Han) is a unique card developed for reading with a presented illumination system. Here again this patent does not deal with the mechanics and operation involved with the insertion of a card into a card reader.

U.S. Pat. No. 5,569,902 (Wood) is hand-held device to read 2D code using a transparent guide for aiming employing an area sensor and unique illumination system. However, Wood requires the user to aim the device to work.

U.S. Pat. No. 4,903,815 (Hirschfield) teaches an automatic vending machine using a barcode scanner. While it mentions a switch to activate the scanner, this is a generic switching method used in any vending machine and is not designed to trigger at the cards leading edge or to help straighten the bent cards.

Finally, U.S. Pat. No. 5,886,334 (D'Entremont) instructs upon a camera-based system to capture a document for read and inspection. Here again this patent does provide any improvement with the mechanics and operation involved with the insertion of a card into a card reader and it requires a plurality of cameras to function.

As such, there exists a continuing need of improvements and simplification in the art of reading and handling coded cards while greatly increasing the capabilities in this relatively new field. Such a device should allow for the easy and fast reading of data on a 2D bar code. Such a device should require no aiming by the user to extract information from the code. Still further, such a device should aid in straightening out cards which have achieved a curved or bent surface due to long storage in a wallet or pocket. Finally, such a device should be small to allow it to be used at the point of purchase or inspection easily and should consume minimum power.

SUMMARY OF THE INVENTION

The device herein disclosed is a compact vertical insertion card scanner is a low power symbology reader, for reading one and two-dimensional bar codes. The device in the current best embodiments reads a standard A7 size card like Driver License or Credit Card without using any mechanical driver for card insertion and reading as is required by conventional line by line scanners. This is accomplished by employing a unique system that self aligns the card with the reader and lets the user insert the card into the device in a vertical or horizontal direction depending on how the barcode is disposed on the card rather than passing through in the conventional horizontal direction, and pushing the card by hand, thus eliminating the need for the conventional and time consuming mechanized drive system required of line-by line readers which must maintain registration of each line to form the digital image for the computer to decode in a time-consuming process.

In a favored embodiment the device reads the bar code employing a means of self-aligning and straitening the card for travel past an image capture device while concurrently detecting the entry of the card to turn on the reader with a switch means in the form of a micro switch. By employing a micro switch located adjacent to the entry point of the card, and inserting the card on the long side along the shorter axis, the overall height of the unit is kept to a minimum while also acting as a trigger switch to turn on the device and activate the scanner. Consequently, the device only consumes electrical power during the scanning process and may in some cases be operated with a low voltage battery. Of course the device can also be configured for insertion of the card longwise should the need arise, by making slightly taller.

As the card is inserted vertically into the device it is pressed against the scanner head by the means of a spring loaded hinged pressure plate. With the resulting close proximity of the card image to the scanner head, the image can be read faster, more accurately and with a higher resolution not encumbered by any disturbance from outside light. Also by pressing directly over the scanning area as the card is inserted, and employing a biased plate to guide the card through its lateral translation in the device, a card that retains some curvature by being carried in a person's wallet will read the same as a flat card.

As the card reaches the lower limits of its travel having been scanned, the bottom edge of the card comes in contact with a second micro switch that turns off the device, or optionally, will reactivate the scanning device for a secondary scan of the card as it is removed from the compact vertical insertion card scanner.

In the best embodiment, a hinge engagement at the lower edge of the pressure plate allows the curved pressure heads or struts located at the top of the pressure plate, to rotate away from the card as the card is inserted, maintaining accurate alignment and constant pressure on the card. This pressure keeps the card in as close a proximity to the scanning head as possible. However, conventional embossed or raised letters on the card surface cannot affect this unique system as it passes into or out of the device with the curved struts acting as a means to prevent jamming against the surface of the pressure plate caused by the raised portions of the card.

An alternate preferred embodiment of the compact vertical insertion card scanner will incorporate a second sensor module affixed to the pressure plate maintaining the pressure against the card. The addition of a second sensor module allows for reading either one or two-dimensional bar codes on either side of the card or on both sides of the card together at the same time. With the incorporation of the two sensor units, it would not make any difference what way the card was inserted into the device and would give the device the ability to scan two data strips, to check for tampering and/or accuracy, should one of the bar codes become damaged.

Further, the provision of a second sensor module and illumination means would provide a unique ability of the device to read both the data on the bar code, and the actual photograph of the bearer which is provided on many forms of identification and credit cards. Since the barcode can be encoded with a digital photo of the bearer, and the device can acquire the actual photo of the bearer from the card, the device can also allow for either a computer comparison of the two images for a positive match, or, the projection of both the digital image from the bar code and the actual image on the card, and allow the user to view them personally, to visually ascertain if they are one and the same person. This would provide an excellent means to identify that the person presenting the card for credit or identification is the proper and authorized bearer of the card.

The preferred embodiment of the device will employ a CIS (Contact Image Scanner) type sensor such as to read the image or other indicia on the card. This sensor module employs an LED module illuminating a line uniformly as the card passes through the device. Also in the preferred embodiment is an ARM7 RISC processor, CPLD, Flash memory and memory in the form SDRAM or other conventional memory is provided to allow the card reader to process all the data on board and then interface with the computer or data processor of choice at a remote location. This miniaturizes the device even further.

By employing a Contact Image sensor (CIS) the device has a fixed Field of View (FOV) and maintains excellent Depth of Field (DOF). The CIS provides an advantage when the target bar code is less than the entire available FOV (like driver license) contacting the sensor in close proximity to the image since it can read the target faster, more accurately, and with a high resolution without any disturbance from out side light.

Further, the preferred device, by using a plurality of means for switching to signal the processor that the card has been inserted, and at the termination of insertion, that travel past the sensor module is finished, the device provides a unique method of scanning bar codes and cards which will greatly accelerate the reading of such cards. The first switching means signals the device that the card has been inserted and is translating across the sensor module. At this point power to the device is turned on thus allowing the device to remain dormant and in a power saving mode until the first switching means is activated. Once the card has fully traveled into the device and past the sensor module, it triggers a second means for switching which when activated signals the device that insertion is completed. This completion signal is sent to the communicating computer or processor and signals it to process the data from the bar code.

If at this point the computer determines that all the data from the various sections of the bar code have been adequately scanned and can be read, the device is finished and will turn off thus saving time and power. If however for some reason the computer determines that segments of data from the bar code are missing or improperly read, and the computer software cannot fully read the data, the second means for switching when moved to the open position will signal the device to run a second scan of the card during the exit travel of the card from the device and to re-scan the barcode to capture all the data again which can be processed individually if totally captured, or, combined with the first scan by the computer and software to build a total image of the bar code and thereby complete the process and read the data in the imaged bar code.

This double read rate capability allows the device to conserve power if a total image is captured on the first traverse past the sensor module, or, to continue for a second scan to capture the total image of the bar code, or as assemble a total image from both scans. Obviously the optimum method would be the capture of the total image on the first pass since both power and time are conserved. However the provision of the ability to re scan on the second pass or to assemble the image electronically using both scans adds utility and long term time savings by insuring an image is captured in one of the three manners.

It is therefor an object of this invention is to create a simple device for reading bar codes on cards whereby the card may be inserted vertically or horizontally and automatically read during insertion.

Another object of this invention is to create a device that is activated automatically when the card is inserted and turned off when the card is removed thereby saving energy and enabling batter power if desired.

An additional object of this invention is to create a device that will read a card through an automated scanning process rather than the conventional cumbersome hand held scanning device.

Another object of this invention is to create a device that will hold the card inserted as close to the sensor as possible by the means of a spring loaded, hinged pressure plate.

A still further object of this invention is the provision of a method of scanning cards inserted into the device which allows for a single scan, or if needed a dual scan to speed up processing by the communicating processor.

An additional object of this invention is the provision of a two-sided card scanning device that will scan either a plurality of bar codes on an inserted card or a photograph and a bar code on such a card and provide a comparison of both for identification of the bearer.

These together with other objects and advantages which will become subsequently apparent and reside in the details of the construction and operation as more fully hereinafter described and claimed, reference being had to the accompanying drawings forming a part hereof, wherein like numerals refer to like parts throughout.

BRIEF DESCRIPTION OF THE DRAWING FIGURES

The accompanying drawings, which are incorporated in and form a part of this specification, illustrate embodiments of the invention and together with the description, serve to explain the principles of the invention.

FIG. 1 depicts the device with a card bearing a bar code and ready for insertion.

FIG. 2 depicts an exploded view of the device.

FIG. 3 depicts a top view of the device showing the insertion slot for insertion of the long edge of the card.

FIG. 4 is a side cut away view of the device showing the card at initial insertion.

FIG. 5 is a side cut away view of the device showing the card moving passed the sensor module and activating a first means for switching.

FIG. 6 depicts the card at full insertion and activating a second means for switching to a second position from a first position, prior to removal.

FIG. 7 depicts a side cut away view similar to FIG. 6 showing the card just after full insertion and starting removal wherein the second means for switching moves back to the first position.

FIG. 8 depicts an embodiment of the device with sensor modules located to allow for scanning of both sides of the inserted card.

DETAILED DESCRIPTION OF THE PRE EMBODIMENTS OF THE INVENTION

Figure 9:
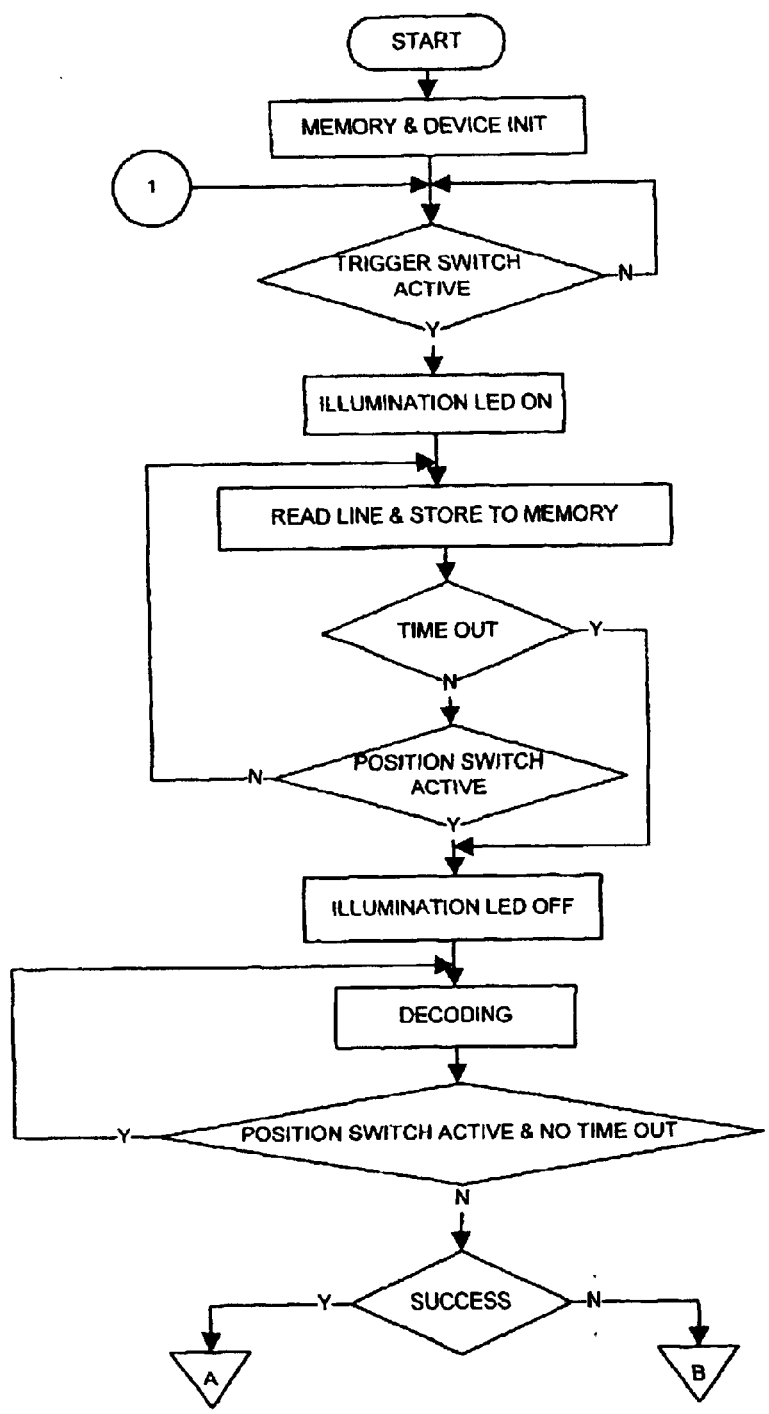
FIG. 9 is a flow chart showing the double read rate method of scanning the bar code during insertion and removal of the card from the device.

As shown in the exploded view of FIG. 1, the device 10 features a cover 12 having a slot 14 formed in a top surface 16. The slot in the current favored mode has a pair of sloped shoulders 18 which surround both ends of the slot 14 thereby providing tapered ends to the slot to provide an easy means to guide the card 20 into the slot 14.

In line with the slot 14 in the cover 12, when the device 10 is assembled, a means to maintain the card in a defined path for lateral translation in and out of the device 10 is provided by a pair of grooves 24 formed vertically in the internal casing 26. These grooves 24 are spaced apart in a manner designed to engage the side edges of the card 20 when it is inserted through the slot 14 and into the device 10 and thereby provide the means to maintain the card in a defined path for lateral translation in and out of the device 10 while the card 20 is vertically translating into and out of the device 10 during use. The beginning point of the defined path would be insertion at the slot 14 and the termination point would be the point where the card 20 either bottoms out or trips a switch means such as pictured in FIG. 6 signaling the communicating computer or computer processor that the card 20 has reached a determined termination point. The cover 12, when assembled on the device, also provides a means to shield the barcode 40 on the card 20 from ambient light during scanning which helps prevent errors in scanning and improved accuracy.

As the card 20 is inserted into the device 10 the ends of the card 20 encounter the sloped ends of the slot 14 at the shoulders 18 thereby providing an initial means to help align the card with the slot 14. Once inserted through the slot 14 by the user, the side edges of the card 20 are engaged by the grooves 24 in the casing 26 which are operatively positioned in line with the ends of the slot 14 to receive the card 20 and thereafter substantially prevent lateral translation of the card while it is vertically translated into the device.

During insertion of the card 20 the leading edge encounters a pressure plate 28 which is biased by a spring 30 or other biasing means so that the pressure plate engages and biases the card 20 on a side surface and toward an electronic imaging component 31 which provides a means for capturing of images on the card 20 as it translates thereby. This engagement by the pressure plate 28 thus provides a means to bias a side surface of the card 20 toward the imaging component 31 as it traverses past it. This maintains the side surface of the card in close proximity to, and at a substantially fixed distance from, the imaging component 31, thereby providing a means to maintain the bar code 40 within a narrow range of distance allowing for a narrow depth of field for focus of the imaging component 31 and is important to allow for the imaging component 31 to read the bar code 40 quickly and more accurately and with a higher resolution. Also by employing a biased pressure plate 28 and the grooves 24 in the casing 26, a card 20 that retains some curvature by being carried in a person's wallet will be straightened and thus a means to flatten the card 20 for scanning and correct image capture as it travels past the imaging component 31, is provided. The smooth traverse of the card 20 across the pressure plate 28 during its downward travel into the device 10 is further enhanced by the provision of a plurality of struts 29 which project from the pressure plate 28. These struts 29 have a substantially curved surface such that the leading edge of the card 20 encounters the curved edges of the struts 29 during insertion and should the card 20 which provides a means to prevent binding of the card 20 against the pressure plate 28 during insertion and removal and is especially helpful in preventing such binding, should the card 20 have the conventional embossed or raised lettering frequently used on credit cards and the like. While the device 10 will function well without the struts 29, their addition is preferred to prevent binding and to enhance the straitening of curved or deformed cards using the pressure of the strut 29 placed to frictionally engage across the middle of an inserted card 20.

A first means for electronic switching in the form of micro switch 32 having a first and second position, is located adjacent to the entry point of the card 20, and has a first position out of contact with the card 20 and a second position which provides a means to trigger or activate the device 10 and energize the imaging component 31. As such, the device only consumes electrical power during the scanning process and may in some cases be operated with a low voltage battery. Such power can be communicated to the device 10 from a transformer, battery, or other means to provide electrical power and in the current best mode such power is communicated to the power jack 11 from a remote source such as a conventional transformer. From the jack 11, electrical power would be communicated to the various components using cables and circuit boards in the conventional fashion.

In the current best embodiment of the device 10 the electronic imaging component 31 functions as a means to capture an electronic image of indicia such as a bar code 40 or a photograph (not shown) on the side surface 19 as it translates past the electronic imaging component 31. There are many such components and more are being developed on a regular basis, consequently those skilled in the art will readily comprehend substitutes and improvements to the electronic imaging component and such is anticipated. Currently, the electronic imaging component 31 an LED module featuring a plurality of Light Emitting Diodes or LED's 38 illuminating a line on the side surface 19 of the card 20 uniformly as the card 20 passes through the device. As shown the LED's 38 are in line is an elongated groove 36 in the imaging component 31 which also has a plurality of image sensors 34 providing the means for capture of an electronic image of indicia such as the bar code 40 on the side surface 19 of the card 20 as it passes by during insertion. Using the illumination from the LED's the images on the card side surface 19 may be thus captured by the image sensors 34 as it slides by, and this image capturing is enhanced by the aforementioned provision of a means to prevent ambient light from reaching the card, and by the means to bias a side surface of the card 20 against the front surface of the electronic imaging component 31 during traverse past the grove 36, and the means to maintain a fixed depth of field, thereby maintaining a preferred light level as well as a fixed distance of the side surface 19 and bar code 40 image from the image sensors 34 of the imaging component 31.

As noted, the imaging component 31 in the best mode to conserve energy is only energized when triggered by the first micro switch 32 and thus saves energy however it is anticipated that should energy conservation not be an issue that the imaging component could be left energized however the current best mode features the micro switch 32 as a trigger. As the side surface 19 passes by the imaging component 31 an electronic image is taken of the bar code 40. This image is communicated electronically to either an on board processor and computer memory (not shown) using conventional wires and cables and/or to a remote computing device using a means for electronic communication of data such as a serial port 41, wireless transmitter, or other conventional means for electronic communication of data between a computer card or remote device and the computer processor and memory. In the current best mode, the device 10 has a RISC processor, onboard memory, and on board software to allow the device 10 to process all the data from the captured image of the 1D or 2D bar code 40 onboard, and then interface and communicate data obtained with a remote computer or data processor of choice at a remote location. However, those skilled in the art will realize that the image captured by the imaging component 31 could also be transmitted for processing to the remote computer by the means for electronic communication of data such as the serial port 41, with, or without onboard processing, and such is anticipated.

As the card 20 reaches a termination point at the lower limit of its travel down the grooves 24 in the casing 26, the lead edge 21 of the card 20 triggers a second means of electronic switching which in the current best mode is second switch 42, which when triggered from a first position at rest to a second it position moved by the card, will signal the device 10 that the first path of travel through the device 10, of the card 20 has terminated. Of course the first switch 32 and second switch 42 might be substituted with other means for electronic switching such as proximity senors or lights and sensor, and the use of other means to determine entry into the defined path and reaching the termination point are anticipated, however the current best mode uses switches. At this point, the software in memory of the computer to which the image from the side surface 19 is transmitted electronically examines the image captured to ascertain if it is complete. Conventionally such bar codes, being either one-dimensional or two-dimensional, are divided into adjoining segments and the software examines the entire image captured to ascertain if all of the image containing all of the individual segments has been sufficiently captured to enable it to be fully read and discerned. After this initial travel past the imaging component 31 using only one pass, the software will activate a means to signal the user to remove the card by using an alarm 44 such as a conventional light, LED, or beeper or other audio and/or visible alarm, to signify the card may be immediately removed and the imaging component 31, however since imaging is complete the imaging component 31 remains off during removal to save energy and processing time since it is no longer needed.

If however the software determines that the image is incomplete and not totally discernable for encoded data, the as the second switch 42 moves to the first position to signal the leading edge 21 of the card is being removed and traveling upward, prior to being removed by the user after the signal to do so is provided, the software in the processor will signal the imaging component 31 to activate and provide power to capture a second image of the bar code 40 on the side surface 19 of the card 20 while it is traveling upward during removal. Once the card is removed, which is signaled to the computer and by the movement of the first switch 32 to the first position prior or out of contact with the card, the imaging component 31 is again de-energized and power consumption by the imaging component 31 ceases. This second image is examined by the software and processor to determine if it contains all of the segments and information necessary for reading of data and if so, will signal reading is over using the aforementioned alarm means. The data will then be processed and displayed as needed to the user to provide the information necessary to complete the transaction or will simply be communicated to a remote data processing device and used accordingly.

If however the second pass and second image taken of the bar code 40 is determined by the software and processor to lack data segments, a third stage is provided in which the computer and software to which the electronic images were transmitted takes the first image and the second image and assembles a third image therefrom using the accurate segments of the first image combined with the accurate segments of the second image to form a valid third image from which the data may be read, processed and used for the intended purpose.

This method which uses three progressive stages of processing provides the best combination of power and time conservation and accuracy by insuring that the device is turned off as soon as a valid readable image is ascertained by the communicating computer and software. It also insures that repeat insertions of the card 20 are virtually eliminated by providing a second pass on removal as well as the ability to form an image from the first and second images should the second pass be unsuccessful also.

An alternate preferred embodiment of the device 10 is also shown in FIG. 6. In this embodiment, a second electronic imaging component 31 would be provided which would be able to image the opposite side surface 19 of the card 20 from the other electronic imaging component 31 and would best be affixed to the pressure plate 28 maintaining the pressure against the card 20. The addition of a second sensor module allows for reading either one or two dimensional bar codes 40 on either or both sides of card 20 at the same time. With the incorporation of the two imaging components 31, it would not make any difference what way the card 20 is inserted into the device 10 and would give the device the ability to scan for two bar codes 40 at once, or, to scan other indicia or images on the card concurrently with scanning the bar code 40 on the other side of the card.

Additionally, the provision of a second imaging component 31 opposite the first, would provide a unique ability of the device to read both the data on the bar code, and the actual photograph of the bearer which is provided on many forms of identification and credit cards. As noted, two-dimensional bar codes frequently are encoded with digital photos of the authorized bearer. Using this data from the bar code 40 from one side of the card, and using the actual photograph on the other side of the card, the device allows for either a computer comparison of the two images for a positive match or the projection of both the digital image from the bar code and the actual image on the card, and allow the user to view them to ascertain if they are one and the same person. This provides an excellent means to identify that the picture on the card of the person presenting the card for credit or identification is the proper and authorized bearer of the card according to the hidden digital image in the bar code 40.

As noted the provision-of equipment which will capture the total image on the side of the card on one pass or two depending upon the accuracy of the first reading allows for a unique method of reading the information contained in the bar code 40 and either ceasing the process if it is complete, or allowing a second reading as the card 20 is removed if the information is complete. As noted earlier, the user would insert the card 20 into the device 10 which would activate a switching means as shown as first micro switch 32 which would trigger the LED 38 to the on position and the electronic imaging component 31 would image the bar code 40 or other indicia such as a photograph as it passed by when pushed into the device 10.

Figure 10:
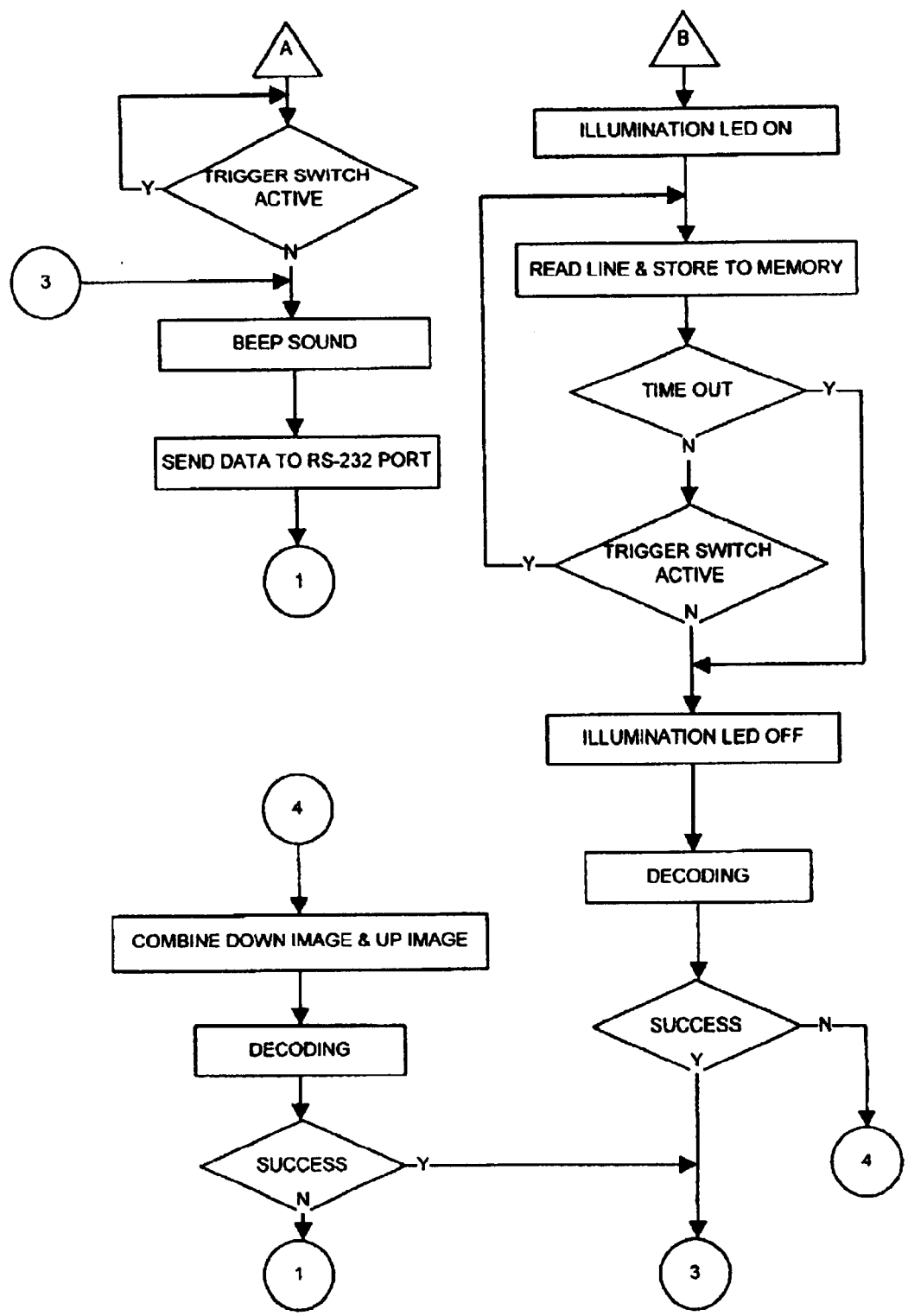
FIG. 10 depicts a continuation of the flow chart of FIG. 9.

FIGS. 9 and 10 graphically depict a flow chart of a preferred method of scanning indicia which in the current best mode is bar code 40 on a conventional indicia bearing card 20. Briefly explained the method would start by turning electrical power to the device 10 on and communicating that power in a conventional fashion to all the components of the device 10. Once so energized the hardware and memory will be initialized and wait until the first trigger switch is activated by the card 20. Once so activated the trigger will cause the LED's 38 of the imaging component 31 to illuminate the card 20 so the image sensors 34 may capture lines of the image of the bar code 40 as it passes by in the defined path from the entry point to the termination point. The lines are captured and stored in onboard memory so long as the card is passed at a sufficient pace to reach the termination point in a determined amount of time. If the pace is too slow, the device 10 will time out.

Once the card 20 reaches the bottom or termination point of travel the second switch 42 or similar means to determine the card has reached the end of the defined path communicates termination to the processor which starts decoding the captured first image. If the first image is decoded and determined to be a successful complete image, then the device would emit a signal and send the complete image to the intended communicating computer, display, or other remote device. Electrical power to all but essential components would be concurrently cut to save energy. If however the first image is determined to be incomplete, then path "B" of FIG. 10 would be followed which would provide for capturing a second image as the card 20 is removed and decoding the second image and combining successfully captured segments of the second image with the first to yield the complete image which would then be transmitted to the intended device.

While all of the fundamental characteristics and features of the Improved Bar Code Scanner and Method have been described herein, with reference to particular embodiments thereof, a latitude of modification, various changes and substitutions are intended in the foregoing disclosure and it will be apparent that in some instance, some features of the invention will be employed without a corresponding use of other features without departing from the scope of the invention as set forth. It should be understood that such substitutions, modifications, and variations may be made by those skilled in the art without departing from the spirit or scope of the invention. Consequently, all such modifications and variations are included within the scope of the invention as defined herein.

What is claimed is:

1. An improved card scanner for imaging and decoding indicia on a side surface of a card, comprising:

means to communicate electrical power to components of said card scanner;

means to maintain a card bearing indicia on least one side surface, in a defined path into and out of said card scanner;

said defined path having a beginning point and a termination point;

means to capture an electric image of said indicia as said card travels in said defined path;

means to trigger said means to capture electronic images to capture a first image of said indicia, when said card translates in said defined path from said beginning point toward said termination point;

means to detect said card reaching said termination point;

means to decode said first image when said card reaches said termination point and determine if said first image is in a complete state or an incomplete state;

means to communicate said image in said complete state to a remote computing device, means to trigger said means to capture an electronic image to capture a second image of said indicia, as said card travels in said defined path from said termination point to removal at said beginning point, should said means to decode said electronic image determine said first image is in said incomplete state when said card reaches said termination point; and said means to decode said electronic image additionally capable of assembling said complete image from said first image and said second image.

2. The improved card scanner for imaging and decoding indicia of claim 1 further comprising:

means to signal the capture of said first image.

3. The improved card scanner for imaging and decoding indicia of claim 2 further comprising:

means to bias said card toward said means to capture an electronic image while said card is traveling in said defined path.

4. The improved card scanner for imaging and decoding indicia of claim 3 further comprising:

means to flatten said side surface of said card during travel in said defined path.

5. The improved card scanner for imaging and decoding indicia of claim 2 further comprising:

means to flatten said side surface of said card during travel in said defined path.

6. The improved card scanner for imaging and decoding indicia of claim 2 further comprising:

means to prevent binding of said card in said defined path caused by embossed portions located on said card.

7. The improved card scanner for imaging and decoding indicia of claim 1 further comprising:

means to bias said card toward said means to capture an electronic image while said card is traveling in said defined path.

8. The improved card scanner for imaging and decoding indicia of claim 7 further comprising:

means to flatten said side surface of said card during travel in said defined path.

9. The improved card scanner for imaging and decoding indica of claim 7 further comprising:
  means to prevent binding of said card in said defined path caused by embossed portions located on said card.

10. The improved card scanner for imaging and decoding indica of claim 1 further comprising:
  means to flatten said side surface of said card during travel in said defined path.

11. The improved card scanner for imaging and decoding indica of claim 1 further comprising:
  said means to capture an electronic image of said indicia as said card travels in said defined path capable of capturing a first indicia image from one point on said card and a second indicia image from another point of said card.

12. The improved card scanner for imaging and decoding indica of claim 11 further comprising:
  said first indicia image being a two dimensional bar code containing data assembleable by said means to decode said electronic image to a first photograph of the authorized bearer of the card;
  said second indicia image being a second photograph of the authorized bearer of the card; and
  whereby said first photograph and said second photograph may be electronically or visually compared for a match.

13. The improved card scanner for imaging and decoding indica of claim 12 further comprising:
  said first indicia image and said second indicia images being on opposite sides of said card.

14. The improved card scanner for imaging and decoding indica of claim 11 further comprising:
  said first indicia image and said second indicia images being on opposite sides of said card.

15. The improved card scanner for imaging and decoding indica of claim 1 further comprising:
  means to prevent binding of said card in said defined path caused by embossed portions located on said card.

16. A method of scanning a bar code located on a card using a electrically powered scanner having an electronic imaging component communicating with a processor having memory and software, comprising the steps of:
  taking a first image of a bar code on a card with an electronic imaging component as said card moves along a defined path in a scanner, from an entry point to a termination point;
  communicating said first image to a processor having memory and software for determining if a captured image is complete image;
  having said processor determine if said first image is a complete image or incomplete image;
  removing said card from said scanner once it reaches said termination point;
  if said processor determines said first image is not complete, taking a second image with said electronic imaging component as said card moves from said termination point to said entry position during removal;
  having said processor assemble said complete image from portions of both said first image and said second image;
  having said processor turn off unneeded electrical power to said scanner if the first image yields said complete image when said card reaches said termination point.

17. The method of scanning a bar code located on a card of claim 16 further comprising the steps of:
  activating a signal to remove said card when it reaches said termination point.

18. An improved card scanner for imaging and decoding indica on a side surface of a card, comprising:
  a body;
  a cover dimensioned to cover said body and having a top surface with a slot therein, said slot sized to accommodate a card for insertion therethrough;
  a defined path into said body for said card in line with said slot, said defined path starting at said top surface and ending at a termination point;
  an electronic imaging component, said electronic imaging component mounted adjacent to said defined path;
  a first switching means for activating said electronic imaging component when said card is inserted into said slot and thereby capture a first image of indicia on said card;
  a processor communicating with said electronic imaging component, said processor having software therein capable of determining if said first image is a complete image or an incomplete image; and
  a second switching means to signal said processor said card has reached said termination point; and
  means for activating said electronic imaging component when said card is removed along said defined path if said processor determines said first image is incomplete, whereby said complete image may be achieved by either of said first image or said first and said second image should said first image be incomplete.

19. The improved card scanner for imaging and decoding indica on a side surface of a card of claim 18 additionally comprising:
  means to signal the user to remove said card from said slot when said card reaches said termination point.

20. The improved card scanner for imaging and decoding indica on a side surface of a card of claim 19 wherein said indica is at least one two dimensional bar code.

21. The improved card scanner for imaging and decoding indica on a side surface of a card of claim 18 further comprising:
  a pressure plate located adjacent to said defined path; and
  biasing means, said biasing means biasing said pressure plate to contact said card during travel in said defined path.

22. The improved card scanner for imaging and decoding indica on a side surface of a card of claim 21 wherein said indica is at least one two dimensional bar code.

23. The improved card scanner for imaging and decoding indica on a side surface of a card of claim 18, further comprising:
  a plurality of curved shoulders rising from said pressure plate, said shoulders providing a contact surface between said card and said pressure plate.

24. The improved card scanner for imaging and decoding indica on a side surface of a card of claim 18 further comprising:
  one of said plurality of curved shoulders positioned between two others of said plurality of curved shoulders to contact substantially a center portion of said card, whereby biased contact of said plurality of curved shoulders with said card provides a means to straighten bent cards during traverse through said defined path.

25. The improved card scanner for imaging and decoding indica on a side surface of a card of claim 18 wherein said indica is at least one two dimensional bar code.

* * * * *